(12) United States Patent
Coates et al.

(10) Patent No.: US 10,959,513 B2
(45) Date of Patent: Mar. 30, 2021

(54) FURNITURE SYSTEM

(71) Applicant: Zoeftig Group Limited, Cornwall (GB)

(72) Inventors: Ian Charles Coates, Cornwall (GB); Simon Lewis Bilton, Warwickshire (GB)

(73) Assignee: Zoeftig Group Limited

( * ) Notice: Subject to any disclaimer, the term of this patent is extended or adjusted under 35 U.S.C. 154(b) by 0 days.

(21) Appl. No.: 16/358,090

(22) Filed: Mar. 19, 2019

(65) Prior Publication Data

US 2019/0281973 A1   Sep. 19, 2019

(30) Foreign Application Priority Data

Mar. 19, 2018   (GB) .................................. 1804359.6

(51) Int. Cl.
*A47C 7/40* (2006.01)
*A47B 13/00* (2006.01)
(Continued)

(52) U.S. Cl.
CPC ............ *A47B 13/003* (2013.01); *A47C 1/124* (2013.01); *A47C 4/02* (2013.01); *A47C 7/72* (2013.01);
(Continued)

(58) Field of Classification Search
CPC ........... A47C 1/124; A47C 1/121; A47C 1/12; A47C 1/16; A47C 4/02; A47C 7/72;
(Continued)

(56) References Cited

U.S. PATENT DOCUMENTS 2,694,543 A * 11/1954 Norris ...................... A47G 1/24
   248/476
3,669,497 A *  6/1972 Massonnet ............... A47C 5/12
   297/448.1
(Continued)

FOREIGN PATENT DOCUMENTS

| DE | 2325372 A1 | 12/1974 |
| JP | H0089358 A | 4/1996 |
| JP | 2001008770 A | 1/2001 |

OTHER PUBLICATIONS

Patents Act 1977: Search Report under Section 17, GB1804359.6, dated Aug. 23, 2018, 1 page.
(Continued)

*Primary Examiner* — Syed A Islam
(74) *Attorney, Agent, or Firm* — Christopher McKeon; Jason Saunders; Arnold & Saunders, LLP

(57) ABSTRACT

A furniture system has a longitudinally extending member (2), a component (4) comprising a mounting member (10) and a component mounting system for mounting the component (4) on the longitudinally extending member (2). The component mounting system includes a support member (7), a clamp member (11) and a fixing member (12). In use, the support member (7) is adapted to be located between the component (4) and the longitudinally extending member (2). The fixing member (12) extends through the clamp member (11) and the support member (7) to engage with the component mounting member (10). Engaging the fixing member (12) with the component mounting member (10) causes the clamp member (11) to engage with an engagement formation (24) on the longitudinally extending member (2) to clamp the support member (7) between the longitudinally extending member (2) and the component (4) to mount the component (4) on the longitudinally extending member (2).

16 Claims, 18 Drawing Sheets

(51) Int. Cl.
*A47C 4/02* (2006.01)
*F16B 2/22* (2006.01)
*A47C 11/00* (2006.01)
*A47C 1/124* (2006.01)
*A47C 7/72* (2006.01)
*A47C 13/00* (2006.01)
*F16B 5/12* (2006.01)

(52) U.S. Cl.
CPC .......... *A47C 11/005* (2013.01); *A47C 13/005* (2013.01); *F16B 2/22* (2013.01); *F16B 5/123* (2013.01); *A47B 2220/0091* (2013.01); *A47B 2230/07* (2013.01)

(58) Field of Classification Search
CPC ..... A47C 11/02; A47C 11/005; A47C 13/005; F16B 2/22; F16B 5/123; A47B 13/003
See application file for complete search history.

(56) References Cited

U.S. PATENT DOCUMENTS

| | | | | |
|---|---|---|---|---|
| 3,982,785 | A * | 9/1976 | Ambasz | A47C 1/023 297/160 |
| 3,990,741 | A * | 11/1976 | Snyder | A47C 1/12 297/248 |
| 4,748,913 | A * | 6/1988 | Favaretto | A47B 17/00 108/50.02 |
| 6,595,584 | B1 * | 7/2003 | Caldwell | A47C 3/025 297/258.1 |
| 6,746,086 | B1 * | 6/2004 | Foster | A47C 4/02 297/170 |
| 6,755,468 | B1 * | 6/2004 | Pan | A47C 3/045 297/239 |
| 6,817,684 | B2 * | 11/2004 | Cattaneo | A47B 21/06 108/50.02 |
| 6,915,915 | B2 * | 7/2005 | Nakajima | A47B 13/003 211/186 |
| 7,073,858 | B2 * | 7/2006 | Fisher | A47C 1/121 297/232 |
| 7,204,553 | B2 * | 4/2007 | Olarte | A47C 1/121 297/248 |
| 8,820,836 | B2 * | 9/2014 | Stewart | A47C 1/12 297/335 |
| 8,864,087 | B2 * | 10/2014 | Goldin | A47B 13/003 248/222.14 |
| 9,060,614 | B1 * | 6/2015 | Gibilterra | A47C 7/54 |
| 9,445,663 | B2 * | 9/2016 | Rutz | A47B 21/06 |
| 9,726,209 | B2 * | 8/2017 | Moller Hansen | A47B 13/003 |
| 2003/0205923 | A1 * | 11/2003 | Haney | A47C 1/121 297/335 |
| 2004/0104613 | A1 * | 6/2004 | Bosman | A47C 7/68 297/451.3 |
| 2013/0037667 | A1 | 2/2013 | Goldin et al. | |
| 2014/0031149 | A1 * | 1/2014 | Liao | A47B 13/088 473/496 |

OTHER PUBLICATIONS

Communication with European Search Report, EP19163669, dated Apr. 29, 2019, 8 pages.

* cited by examiner

Fig. 18

FURNITURE SYSTEM

FIELD OF THE INVENTION

The invention relates to a furniture system and especially, a furniture system having a longitudinally extending beam on which a number of items of furniture or furniture components, such as seats, tables, power units and linking bars, are mounted.

BACKGROUND TO THE INVENTION

It has become common place for furniture systems for waiting and audience areas, such as airport lounges, or stadiums or auditoriums to have seats and in some instances, other furniture components, mounted on a horizontal beam that is supported on a floor by legs. Typically, the legs, the seats and any arms, tables, power units or linking bars, are all mounted on the beam. The seats used may be fixed seats in which the seat portion and back portion are fixed relative to each other or may be flip-up seats in which the seat portion can rotate relative to the back portion and the beam between a horizontal, in use position, and a vertical, stowed position. The flip-up seat type is common particularly in auditoriums or stadiums, where the stowed position enables easier access by users between rows of seats. The fixed seat arrangement is more common in waiting areas, where seating is more spaced out and access between closely arranged rows is not required.

The mounting of all the components on a single support beam increases flexibility of configuration and also enables the configuration to be modified if necessary. For example, one beam mounted on legs can be used to support four seats with arms, four seats without arms, three seats and one table or two seats and two tables, with or without arms. It is also possible in these systems to run electrical or data cables through the beam to also permit mounting of power units, including for example, power sockets and/or communication sockets, on the beam, for example, adjacent to seats or adjacent to or on tables.

In these conventional furniture systems, it is common place for a mounting bracket to be fixed to the underside of the seat, usually using a threaded fastener. The seat is then mounted on the beam using further threaded fasteners that usually either penetrate through the mounting bracket into threaded engagement with the beam or alternatively, by the use of clamps which are clamped onto a formation on the beam using threaded fasteners that threadedly engage with the mounting bracket. In a further alternative, the mounting brackets are arranged such that they clamp fully around the extent of the beam.

These conventional systems have the disadvantage of requiring a load bearing and torque bearing fixing between the mounting bracket and the seat and a further load bearing and torque bearing connection between the beam and the mounting bracket using the fasteners which either threadedly engage with the beam or with the mounting bracket to fix mounting brackets to the beams.

Another disadvantage of these conventional furniture systems is that where arms are mounted on the beam between seats, the arms must be mounted using at least two separate fixings in order to fix the arm to the beam.

SUMMARY OF THE INVENTION

In accordance with a first aspect, there is provided a furniture system comprising a longitudinally extending member, a component comprising a mounting member and a component mounting system for mounting the component on the longitudinally extending member; the component mounting system comprising a support member, a clamp member and a fixing member, whereby in use, the support member is adapted to be located between the component and the longitudinally extending member, and the fixing member extends through the clamp member and support member to engage with the component mounting member and to engage the clamp member with an engagement formation on the longitudinally extending member to clamp the support member between the longitudinally extending member and the component to mount the component on the longitudinally extending member.

The engagement formation may comprise an undercut formation. Typically, the undercut formation is on the opposite side of the engagement formation from the surface of the longitudinally extending member contacted by the support member. The engagement formation may be in the form of a lip, which may be adjacent a corner of the longitudinally extending member. The engagement member may extend outwardly from a side of the longitudinally extending member.

Typically, the component mounting system further comprises two clamp members and two fixing members, and the longitudinally extending member includes two engagement formations on opposite sides of the longitudinally extending member; and wherein one clamp member engages with each formation when the fixing members are engaged with the component mounting member.

The engagement formations may extend along the length of the longitudinally extending member. Preferably, the engagement formations are substantially parallel to each other.

Typically, the clamp member includes a first retaining formation and the support member includes a second retaining formation, and the clamp member is engaged with the support member so that the first and second retaining formations engage with each other to retain the clamp member on the support member prior to engagement of the fixing member with the component mounting member. The first and second retaining formations effectively form a detent mechanism. Preferably, after the first and second retaining formations are engaged with each other, the clamp member is still movable relative to the support member.

Typically, the surface of the support member that engages with the longitudinally extending member comprises a concave surface and the surface of the longitudinally extending member has a complimentary convex surface that engages with the concave surface of the support member.

The convex surface may extend along the length of the longitudinally extending member with a convex profile of the convex surface being across the width of the longitudinally extending member and preferably, substantially perpendicular to a longitudinal axis of the longitudinally extending member.

Typically, the engagement formation is adjacent to the convex surface. Where there are two engagement formations, they may be located on opposite sides of the convex surface.

Preferably, the system further comprises two component mounting systems for mounting the component, one component mounting system adjacent each side edge of the component.

Typically, the engagement formation extends outwardly from a side of the longitudinally extending member. The engagement formation may be at an angle to the convex surface of the longitudinally extending member contacted by the support member or may be a continuation of the convex surface. A formation recess may be provided between the convex surface and the engagement formation.

Typically, the support member has a profile which engages with a surface of the engagement formation adjacent to the convex surface.

Preferably, the component mounting system further comprises means to attach the support member to the component prior to engagement of the fixing members with the component mounting member.

Typically, the component is one of: (i) a seat; (ii) a table; (iii) a power unit; and (iv) a connecting member to connect the furniture system to another furniture system.

In accordance with a second aspect, there is provided an arm for a furniture system having a longitudinally extending member, the arm comprising an arm member having a first end and a second end adjacent the first end, the ends each having a clamping formation and the ends being relatively movable to each other between a first position, in which the ends can be placed over an engagement formation on the longitudinally extending member, in use, and a second position, in which each clamping formation engages with one of the engagement formations on the longitudinally extending member, in use, and arm fixing means engageable with the ends to retain the clamping formations in engagement with the engagement formations on the longitudinally extending member to mount the arm member on the longitudinally extending member, in use.

Preferably, the ends of the arm member are biased from the first position to the second position. The ends may be biased to the second position by inherent elastic properties of the arm member.

The arm member may be formed as a single member.

Preferably, the arm fixing means is engageable with the ends at a location spaced from the clamping formations. More preferably, the arm fixing means is engageable further from the extremities of the ends than the location of the clamping formations.

Typically, the arm member further comprises a central portion and two side portions, each side portion extending from an opposite end of the central portion, and wherein the first end is located at an opposite end of one side portion from the central portion and the second end is located at the opposite end of the other side portion from the central portion.

The side portions may be angled towards each other from the central portion to the first and second ends, respectively.

Typically, the first and second ends each include diverging sections that are angled relative to each other so that the ends diverge from each other towards their extremities.

The arm fixing means may engage with the first and second ends at or adjacent to the point at which they start to diverge from each other.

Typically, the clamping formations are on the diverging sections of the first and second ends.

Preferably, the arm fixing means engages with the first and second ends to exert a force that acts to urge the first and second ends towards each other.

Typically, the arm fixing means comprises a fastener that passes through the first end and engages with a fixing formation in the second end.

In accordance with a third aspect, there is provided a leg for a furniture system comprising a longitudinally extending member, the leg comprising a leg member having a recess adapted to receive the longitudinally extending member, in use, and a cover for covering the end of the longitudinally extending member; wherein the recess includes a cover formation to permit the cover to be mounted in the recess, such that when the longitudinally extending member is inserted into the recess, in use, the cover covers an end of the longitudinally extending member.

Preferably, the cover includes an insertion member which engages with the longitudinally extending member when the longitudinally extending member is inserted into the recess. Typically, the insertion member is adapted to engage with a hollow within the longitudinally extending member.

Typically, the cover further includes a first fixing member mounted in the insertion member, such that when the longitudinally extending member is inserted into the recess in the leg, in use, the insertion member and the first fixing member are located within the longitudinally extending member, and wherein a second fixing member may be inserted through a portion of the leg and a side wall of the longitudinally extending member to engage with the first fixing member to retain the longitudinally extending member within the recess in the leg.

Preferably, an upper edge of the recess is adapted to engage with an engagement formation on the longitudinally extending member, in use. The upper edge of the recess may be adapted to engage in an undercut in the engagement formation, in use.

The longitudinally extending member may be provided with two engagement formations, the engagement formations being on opposite sides of the longitudinally extending member. Two opposite upper edges of the sides of the recess may each be adapted to engage with one of the engagement formations, in use.

The leg may further comprising a top cover, the top cover being adapted to be located over end of the longitudinally extending member located in the recess, in use, to conceal the end of the longitudinally extending member. The top cover may be adapted to engage with a top cover engagement formation on the longitudinally extending member, in use. In one example, the engagement formation may constitute the top cover engagement formation.

The leg may further comprise an arm adapted to be mounted on the longitudinally extending member above the leg, in use. The arm may be an arm in accordance with the second aspect.

In accordance with a fourth aspect, there is provided a furniture system comprising a longitudinally extending member and at least one of: (i) a leg according to the third aspect; and (ii) an arm according to the second aspect.

The furniture system of the first aspect may further comprise at least one of: (i) an arm according to the second aspect; and (ii) a leg according to any the third aspect.

The longitudinally extending member may include a channel extending along the length of the longitudinally extending member, the channel being adapted to receive an electrical cable, in use.

Typically, the longitudinally extending member may include a support surface to support a component or a support member for a component. The support surface is preferably a curved upper surface, and more preferably is convex.

The engagement formation on the longitudinally extending member may comprise an undercut formation. Typically, the undercut formation is on the opposite side of the engagement formation from the support surface of the longitudinally extending member. The engagement formation may be in the form of a lip, which may be adjacent a corner of the longitudinally extending member. The engagement member may extend outwardly from a side of the longitudinally extending member.

Typically, the engagement formation extends outwardly from a side of the longitudinally extending member. The engagement formation may be at an angle to the convex surface of the longitudinally extending member contacted by the support member or may be a continuation of the convex surface. A formation recess may be provided between the convex surface and the engagement formation.

Preferably the longitudinally extending member has two engagement formations, which are typically on opposite sides of the longitudinally extending member. The engagement formations may extend along the length of the longitudinally extending member. Preferably, the engagement formations are substantially parallel to each other.

Typically, the engagement formation is adjacent to the support surface. Where there are two engagement formations, they may be located on opposite sides of the support surface.

The longitudinally extending member may be a structural load bearing member.

The longitudinally extending member may be an elongate member, such as a beam. The longitudinally extending member may be hollow.

BRIEF DESCRIPTION OF THE DRAWINGS

An example of a furniture system in accordance with the invention will now be described with reference to the accompanying drawings, in which:

FIG. 18 an exploded perspective view from below of the support bracket mounted on the seat and the clamps.

DESCRIPTION OF THE PREFERRED EMBODIMENTS

Figure 1:
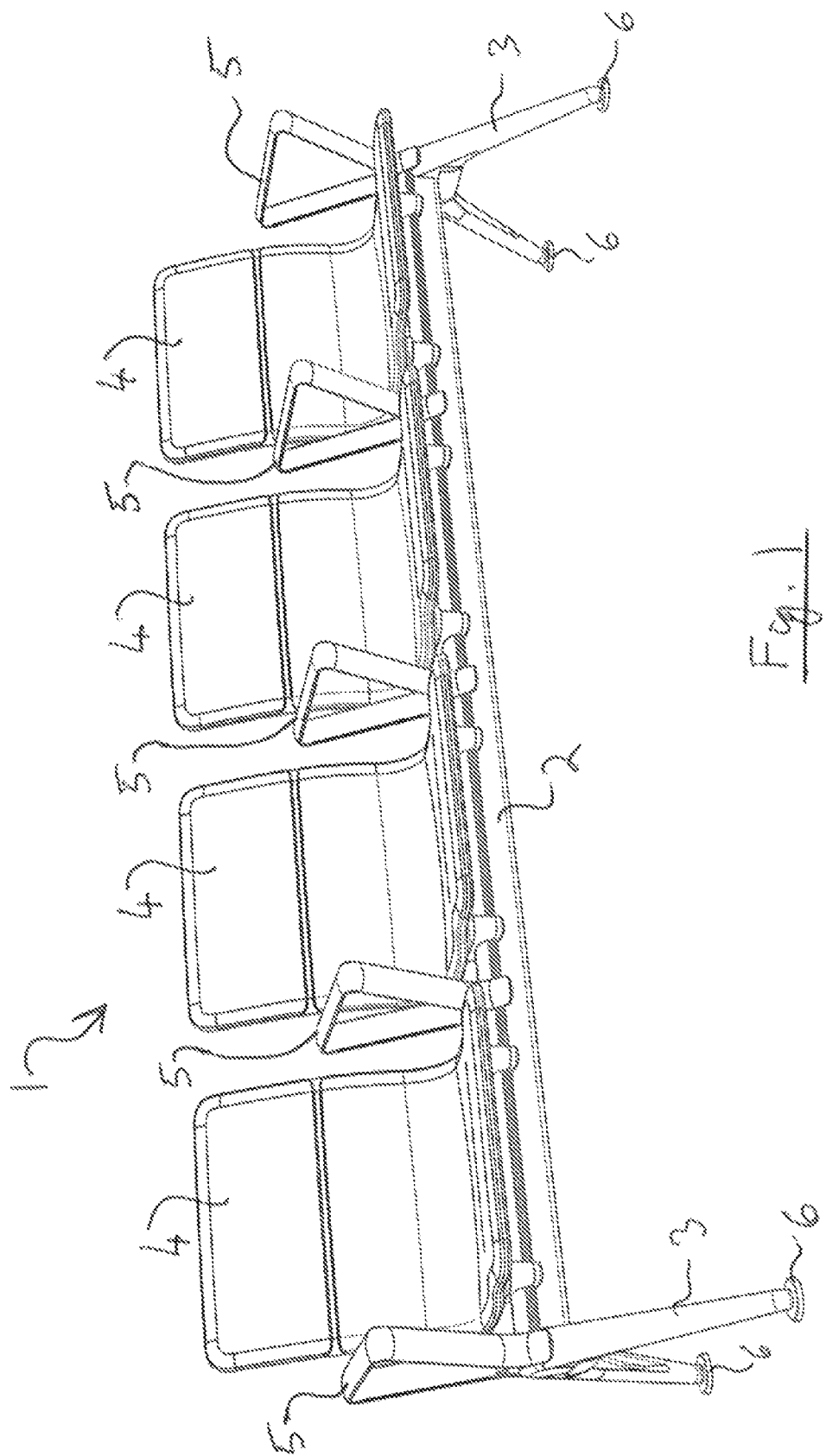
FIG. 1 is a front perspective view of a furniture system.
Figure 2:
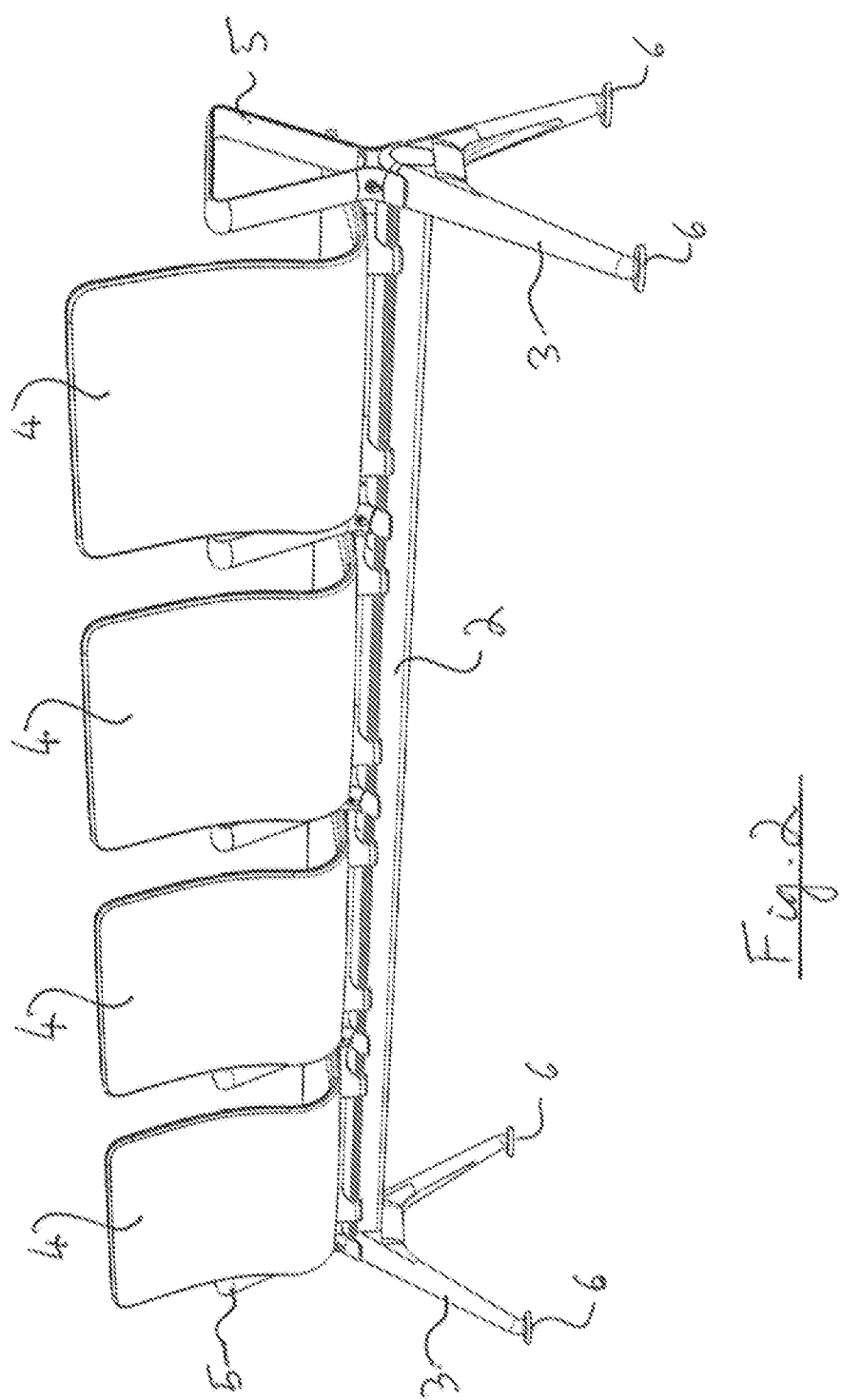
FIG. 2 is a rear perspective view of the furniture system shown in FIG. 1.

FIGS. 1 and 2 show a furniture system 1 comprising a horizontally extending beam 2 supported by two legs 3. The legs 3 are located at opposite ends of the beam 2. Mounted on the beam 2 are four seats 4 and five arms 5. Two of the arms 5 are located at opposite ends of the beam 2 and are mounted on the beam 2 above a respective leg 3. The legs 3 each have a foot 6 attached to their lower end which can rest on a surface that supports the furniture system 1, such as a floor.

Typically, the beam 2 may be manufactured form a metal material, such as aluminium. However, any suitable metal material could be used for the beam 2. The legs 3 and arms 5 can be manufactured either from a metal material or from a plastics material. If the legs 3 and arms 5 are manufactured from a plastics material, the plastics material may be reinforced with another material, such as glass fibre. Alternatively, or in addition, the arms and or the legs may comprise a metal core or frame covered by or encapsulated by the plastics material.

The seats 4 may comprise any suitable material, such as wood, plastic or metal. In addition, the seats may be a combination of materials, such as a combination of plastic or metal or a combination of wood and plastic. The seats 4 may be, optionally, upholstered.

Figure 3:
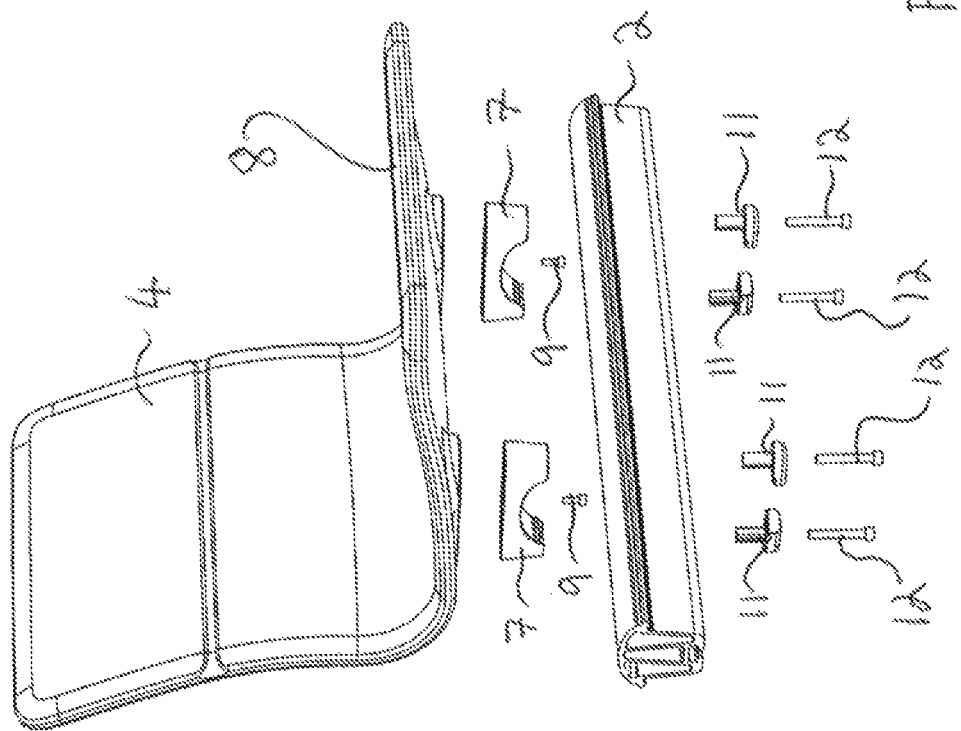
FIG. 3 is an exploded perspective view showing components for mounting a seat on a beam.
Figure 4:
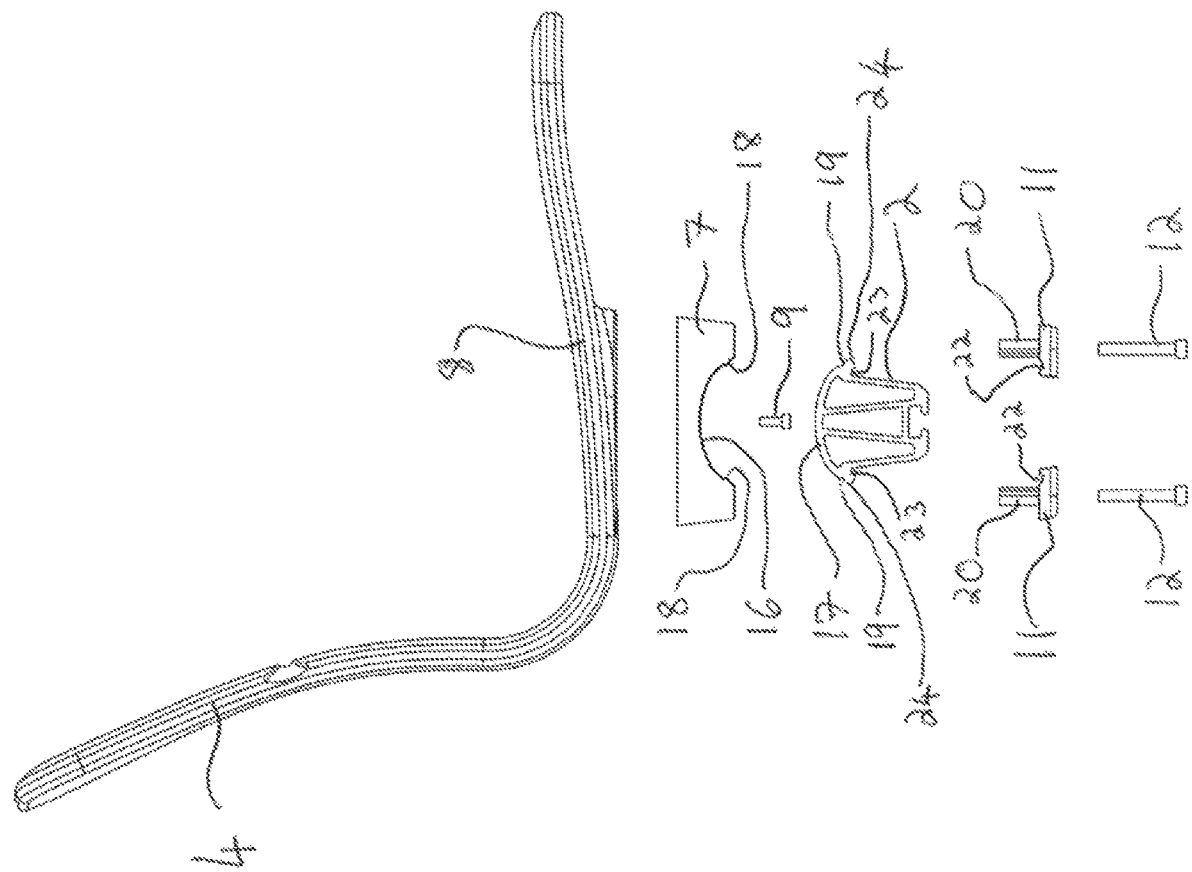
FIG. 4 is a side view of the exploded view of FIG. 3.
Figure 5:
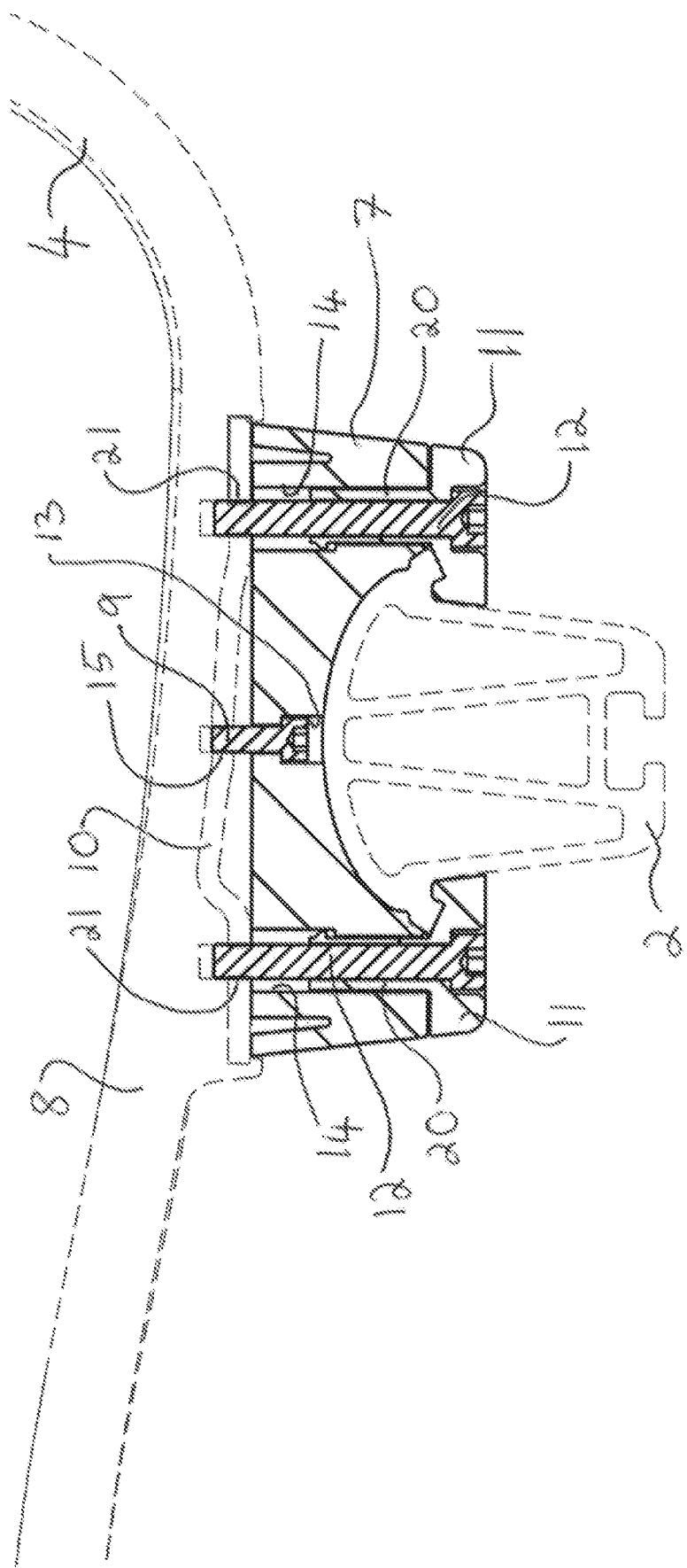
FIG. 5 is a cross-sectional view of a support bracket mounted on the seat and the beam.

The mounting of the seats 4 to the beam 2 is shown in detail in FIGS. 3 to 5. The seat mounting system includes two mounting brackets 7 located adjacent opposite side edges of seat section 8 of the seat 4. A fastener 9, such as a threaded bolt is used to connect each of the mounting brackets 7 to the underside of seat portion 8. As shown in FIG. 5, the fastener 9 engages with a seat plate 10 located within the seat section 8. The plate 10 is formed from a structurally strong material, such as metal plate, and is adapted to receive the fastener 9. For example, if the fastener 9 is a threaded fastener, such as a threaded bolt, then a threaded hole 15 may be formed in the plate 10 to receive the threaded fastener 9. The mounting system also includes four clamps 11 and four clamp fasteners 12. The clamp fasteners 12 are also typically threaded fasteners, such as threaded bolts. However, any suitable fastening mechanism could be used. Two clamps 11 are provided for each mounting bracket 7. As shown in FIG. 5, each bracket 7 includes a central hole 13 through which the fastener 9 may be inserted and two lateral holes 14. All of the holes 13, 14 extend all the way through the brackets 7.

In order to mount the seat 4 to the beam 2, the brackets 7 are attached to the underside of the seat portion 8 and to the plate 10 using the fastener 9. The fastener 9 is inserted through the hole 13 in the bracket 7 and into the threaded hole 15 in the plate 10. The fastener 9 only has to be tightened sufficiently in order to hold the brackets 7 in position on the underside of the seat portion 8. After the brackets 7 have been fitted to the underside of the seat portion 7, the seat can be placed on the beam by locating recess 16 on the underside of the brackets 7 on to the top surface 17 of the beam 2. The shape of the recess 16 is complimentary to the shape of the top surface 17 so that the brackets 7 locate on the top surface 17. In addition, nibs 18 formed near the edges of the recess 16 engage with indents 19 on either side of the top surface 17 of the beam 2. This assists with location of the seat 4 and brackets 7 on the beam 2 and also helps to prevent the seat sliding off the beam 2 prior to engagement of the clamps 11 and fasteners 12.

Figure 18:
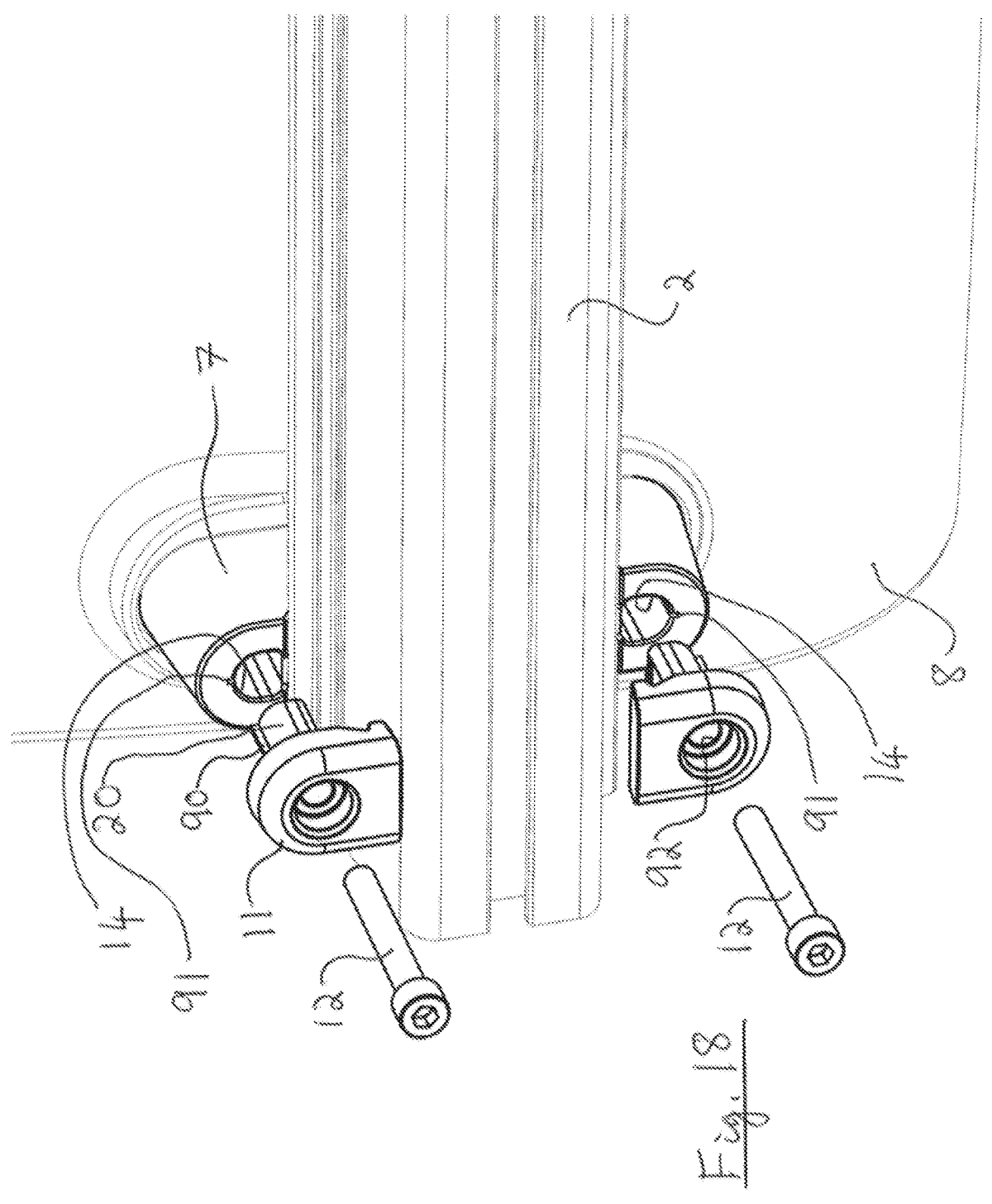

The clamps 11 each have a stem 20 which includes a rib 90 that engages with a complimentary recess 91 in the hole 14, as shown in FIG. 18. The stem 20 is hollow and defines a through bore 92 into which the fastener 12 is inserted.

Figure 16:
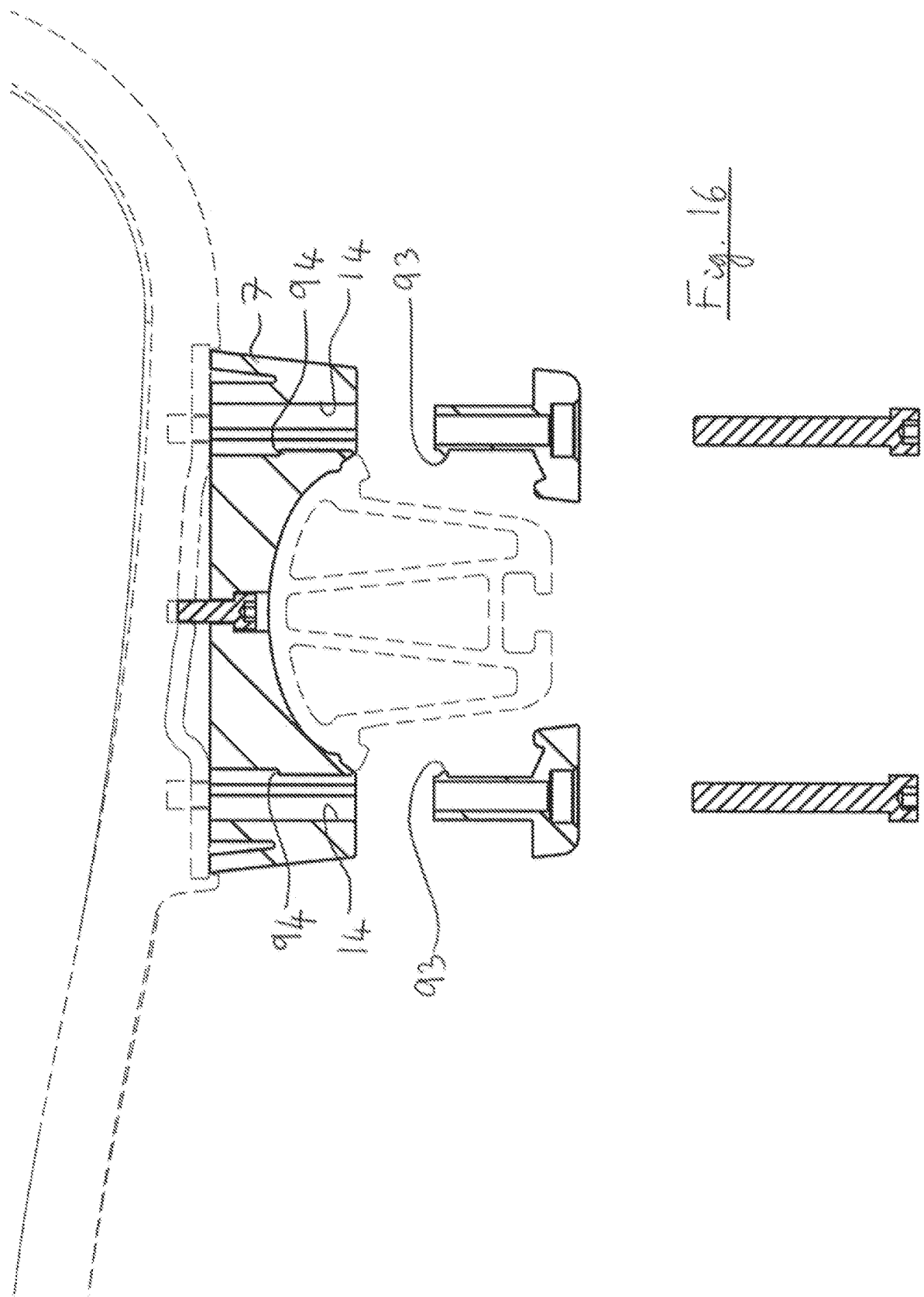
FIG. 16 is an exploded cross-sectional view of a support bracket and clamps for mounting the seat on the beam.
Figure 17:
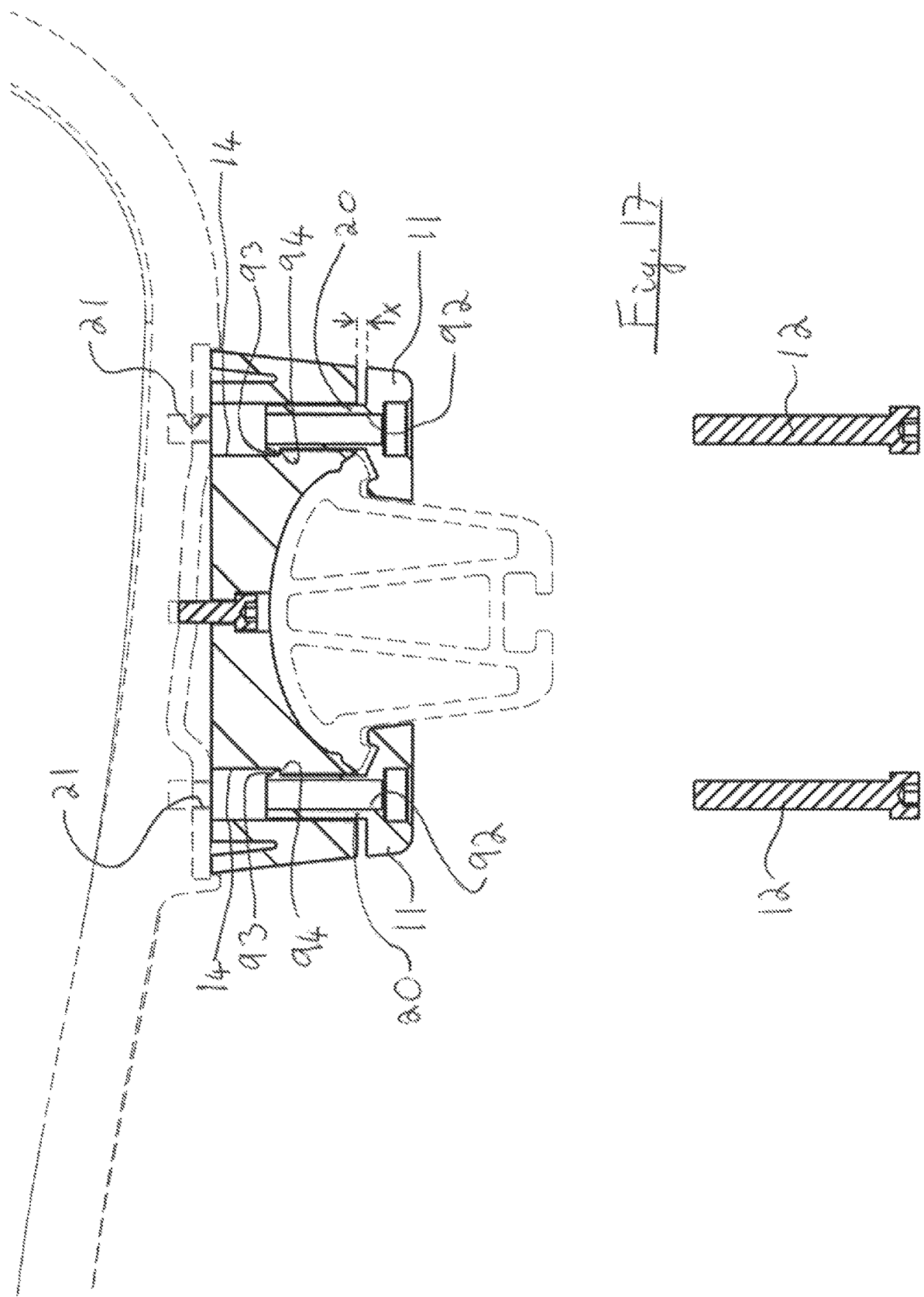
FIG. 17 is an exploded cross-sectional view similar to FIG. 16 but with the clamps inserted into the support bracket.

The clamps 11 also have a barb 93 on the stem 20 and the holes 14 in the bracket 7 each have a lip 94 (see FIG. 16). When the stem 20 of a clamp 11 is inserted into a hole 14 in the bracket 7, the rib 90 enters the recess 91 and this aligns the clamp 11 with the bracket 7 and the beam 2. When the stem 20 is inserted into the hole 14, the side wall of the hole 14 deflects the nib 93. As the stem 20 is pushed further into the hole 20, the nib 93 passes the lip 94 which permits the nib 93 to move outwardly beyond the lip 94. When the nib 93 passes the lip 94, the combination of the lip 94 and nib 93 prevent the clamp 11 falling out of the bracket 7 and the clamp 11 is retained on the bracket 7 by the lip 94 and the nib 93. Hence, the nib 93 and lip 94 act as a detent mechanism to retain the clamp 11 in the bracket 7. The distance of the lip 94 from the entrance of the hole 14 is chosen such that after the nib 93 passes the lip 94, the clamp 11 is still able to have some relative movement into and out of the hole 14, as shown in FIG. 17 where it can be seen that after the nib 93 passes the lip 94 there is a gap "X" between the clamp 11 and the bracket 7. In other words, the nib 93 passes the lip 94 before the stem 20 is fully inserted into the hole 14. This permits adjustment of the position of the seat 4 along the beam after insertion of the clamps 11 into the bracket 7, if necessary.

After the seat 4 is placed on the beam 2 such that the recesses 16 in the brackets 7 engage with the top surface 17, the clamps 11 are inserted into their respective holes 14 in the bracket. The holes 14 in the brackets 7 are configured such that when stems 20 of the clamps 11 are inserted into the holes 14, the detent mechanism formed by the nib 93 and the lip 94, loosely retains the clamps 11 on to the brackets 7. As explained above, the detent mechanism is preferably activated before the clamps 11 are inserted all the way into the holes 14. The stems 20 are hollow so that the fasteners 12 may be inserted through the stems 20. After the stems 20 of clamps 11 have been inserted into the holes 14, the fasteners 12 can be inserted through the holes 92 in the stems 20 of the clamps 11, through the hole 14 of the brackets 7 and into the underside of the seat portion 8 so that they engage with threaded holes 21 in the seat plate 10. Tightening of the fasteners 12 into the threaded holes 21 pulls the clamps 11 upwards towards the bracket 7 and the seat plate 10, so that recessed sections 22 on the clamps 11 engage with lip 24 formed on the beam 2 and underside 23 of the lip 24 (see FIG. 5). This tightening of the fasteners 12 to pull the clamps 11 into engagement with the underside of lip 24 of the beam 2 causes the seat brackets 7 to be clamped between the top surface 17 of the beam 2 and the seat plate 10, thereby mounting the seat 4 onto the beam 2. This clamping mechanism and the use of the undercut lip 24 that is engaged by complementary recessed sections 22 of the clamps help to minimise the possibility of any play in the fitting of the brackets 7 and clamps 11 to the beam 2, such as due to manufacturing tolerances.

Therefore, the fasteners 12 that secure the seat 4 to the beam 2 engage directly with the seat plate 10 to effectively clamp the brackets 7 between the beam 2 and the seat 4. Hence, the fasteners 12 do not attach or fix to the brackets 7 and this helps minimise torsional loading on the brackets 7.

In the example described above and shown in FIGS. 3 to 5 and 16 to 18, two clamps 11 are provided for each support bracket 7 and each clamp is attached by a fastener to the plate 10. Hence, both clamps need to be tightened in order to clamp each bracket 7 between the seat portion 8 and the beam 2. As an alternative to this, it is possible that instead of one of the clamps 11, a clamp formation could be integrated into the bracket 7 or a clamp pre-assembled and fixed to the bracket 7. This would enable the integrated clamp formation on the bracket 7 or the pre-assembled clamp to be hooked over one of the lips 24 and then the remaining clamp 11 to be tightened onto the other lip 24 using the fastener 12.

Although the above description and FIGS. 2 to 5 and 16 to 18 show how a seat can be mounted on the beam 2 using the mounting system, the same mounting system can also be used, in a similar manner to mount other furniture system components, such as tables, and in particular table tops, power units and linking bars on the beam 2. The power units may be supplied by electrical cable which is routed through a channel, such as a hollow or recessed channel, in the beam. The power unit may include power sockets and/or data sockets. Linking bars may be used to couple together two furniture systems 1 in back-to-back relationship. This is helps to prevent the two back-to-back furniture systems moving relative to each other, for example through use or from impact other objects such as floor cleaners. Linking bars are generally used where two furniture systems are placed back-to-back in waiting areas.

Figure 6:
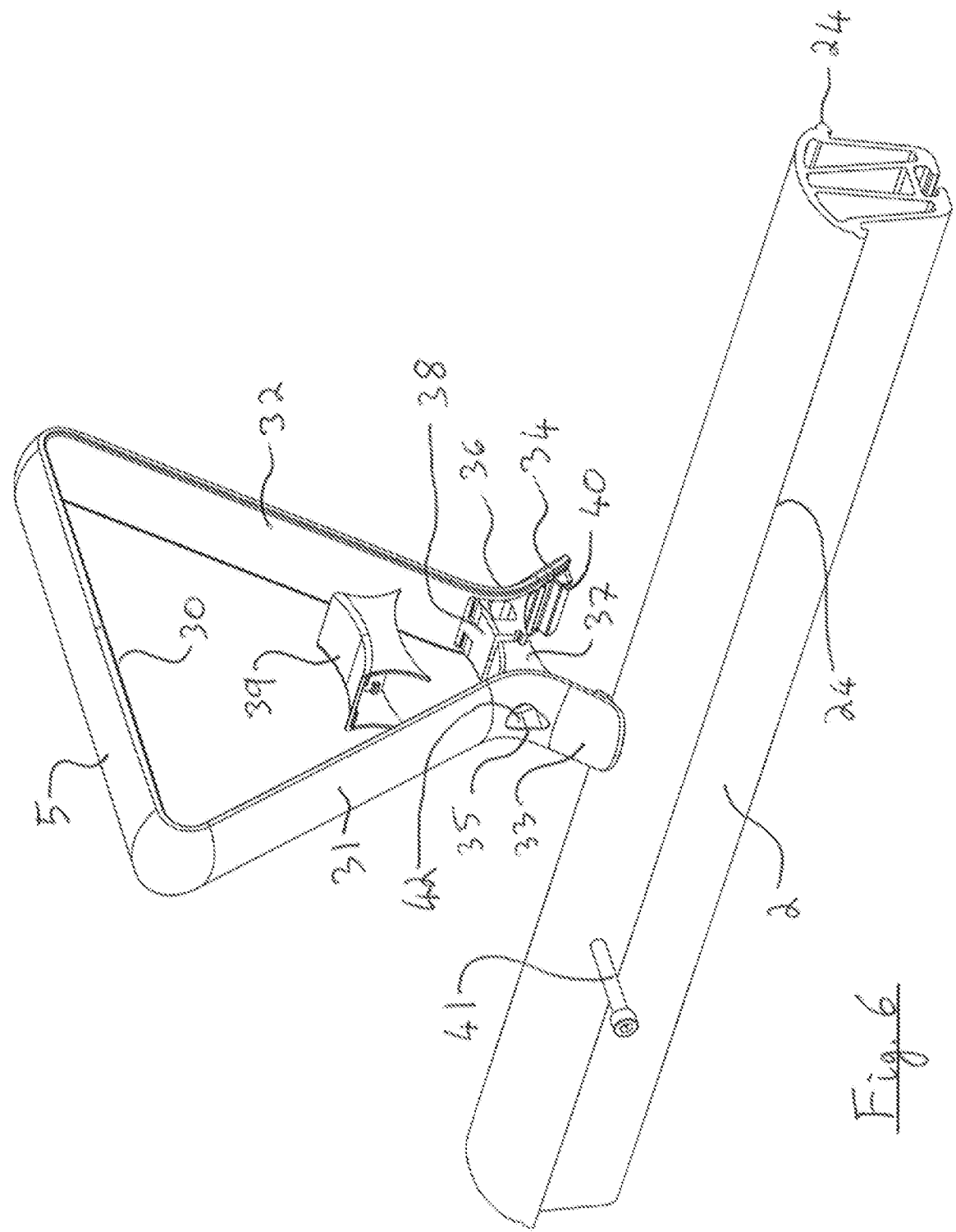
FIG. 6 is a perspective exploded view of an arm for mounting on the beam.
Figure 7:
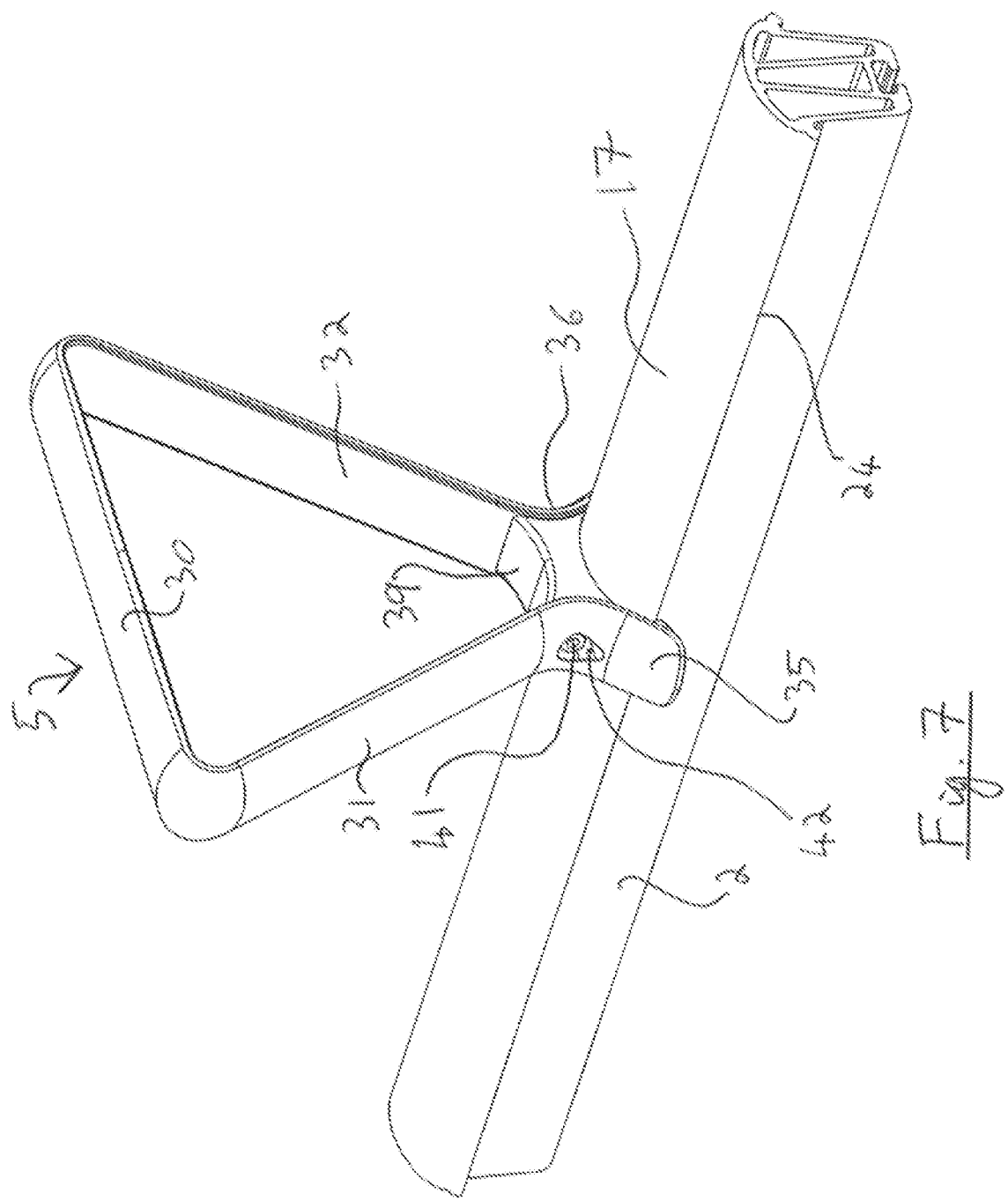
FIG. 7 is a perspective view showing the arm mounted on the beam.
Figure 8:
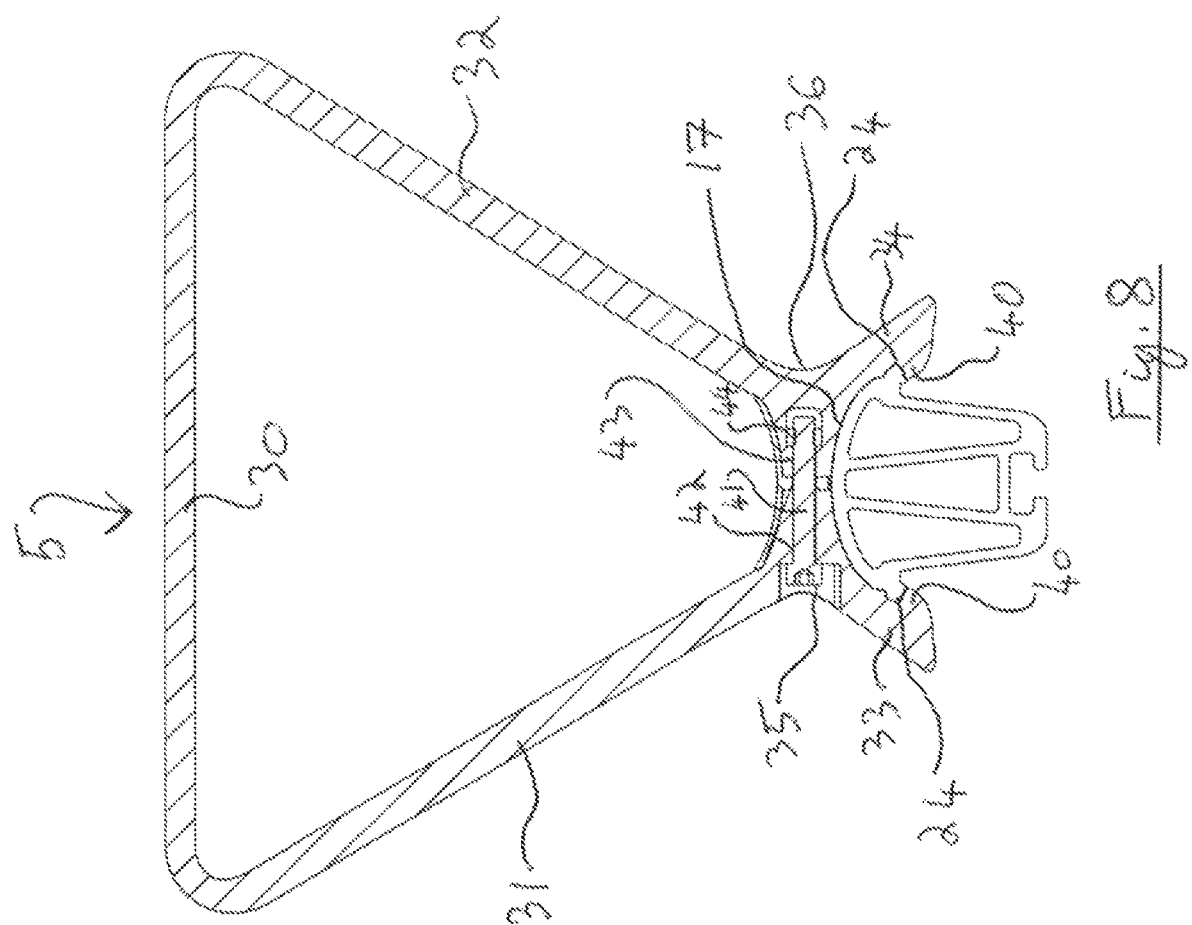
FIG. 8 is a cross-sectional view of the arm mounted on the beam.

FIGS. 6 to 8 show how the components of the arms 5 and how the arms 5 are mounted onto the beam 2. The arm 5 is generally in the shape of an inverted triangle and has a central section 30 and two side sections 31, 32. Opposite the central section 30, the side sections 31, 32 transform into concave sections 35, 36 that themselves transform into ends 33, 34. Extending inwardly from the concave sections 35, 36 and substantially parallel to the central section 30 is a first inwardly extending section 37 and a second inwardly extending section 38. A cover 39 is also provided that is located over the protruding sections 37, 38. The cover 39 assists in maintaining a connection between the protruding sections 37, 38 before the arm 5 is mounted on the beam 2. Each of the ends 33, 34 has an inwardly extending protrusion 40.

The shape of the arm 5 together with the material from which the arm 5 is manufactured, is such that the ends 33, 34 can be moved apart from each other by flexing of the arm sections 30, 31, 32. This enables the ends 33, 34 to be moved apart from each other sufficiently to enable the protrusions 40 to be positioned over the lips 24 on the beam 2, as shown in FIG. 8. The cover assists with enhancing the lateral rigidity of the side sections 31, 32 to inhibit relative sideways movement between the side sections 31, 32 and the ends 33, 34 before the arm 5 is mounted on the beam 2, while still enabling the side sections 31, 32 and the ends 33, 34 to be moved away from each other in a direction substantially parallel to the central section 30 so that the ends 33, 34 can be separated far enough to be placed over the lips 24 on the beam 2.

When the ends 33, 34 are placed over the lips 24 and then released, the underside of the inwardly extending sections 37, 38 engage with the top surface 17 of the beam 2, such that the arm 5 rests on the top surface 17 of the beam 2. After the arm 5 is positioned on the beam 2, as explained above, a threaded fastener 41 can be inserted into a hole 42 in the first inwardly extending section 35 and through the hole 42 into a hole 43 in the second inwardly extending section 38.

The inwardly protruding section 38 also includes a captive nut 44 with which the fastener 41 can be threadedly engaged. Alternatively the arm can be assembled with the threaded fastener already threaded into the captive nut as the threaded fastener 41 is long enough to permit the ends 33, 34 to be separated sufficiently to allow the arm to flex over the beam before the fastener 41 is tightened to secure the arm in place. Hence, tightening of the fastener 41 into the captive nut 44 pulls the sections 37, 38 together, thereby pulling the ends 33, 34 together and securing the protrusions 40 under the lips 24 of the beam 2 to fixedly mount the arm 5 onto the beam 2.

Figure 9:
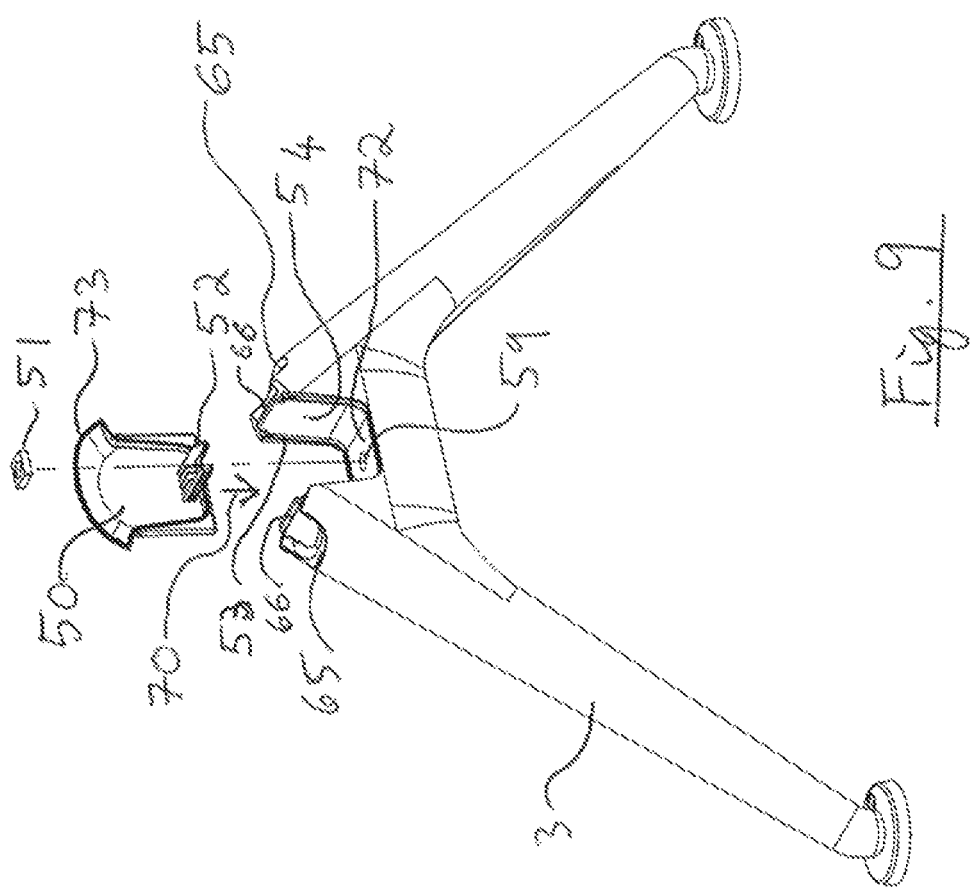
FIG. 9 is an exploded view of a leg for supporting the beam.

FIG. 9 shows one of the legs 3. An end cap 50 has a retaining section 52 into which a threaded nut 51 is located and retained by the retaining section 52.

The end cap 50 with the nut 51 in the retaining section 52 is slid downwards in the direction of arrow 70 into a groove 53 formed in the side of a recess 54 in the leg 3.

Figure 10:
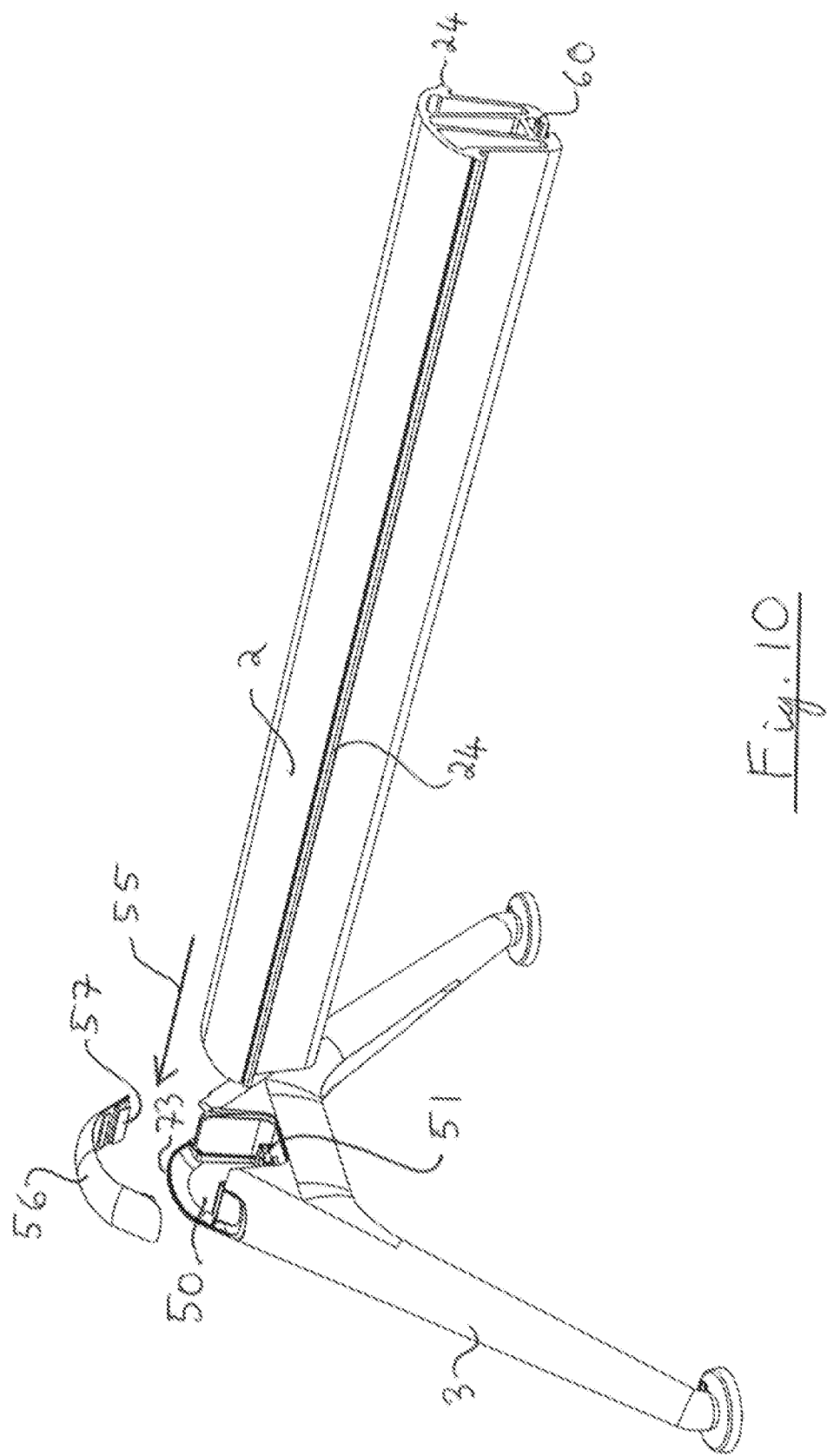
FIG. 10 is a perspective view of the leg and the beam to be mounted on the leg.
Figure 11:
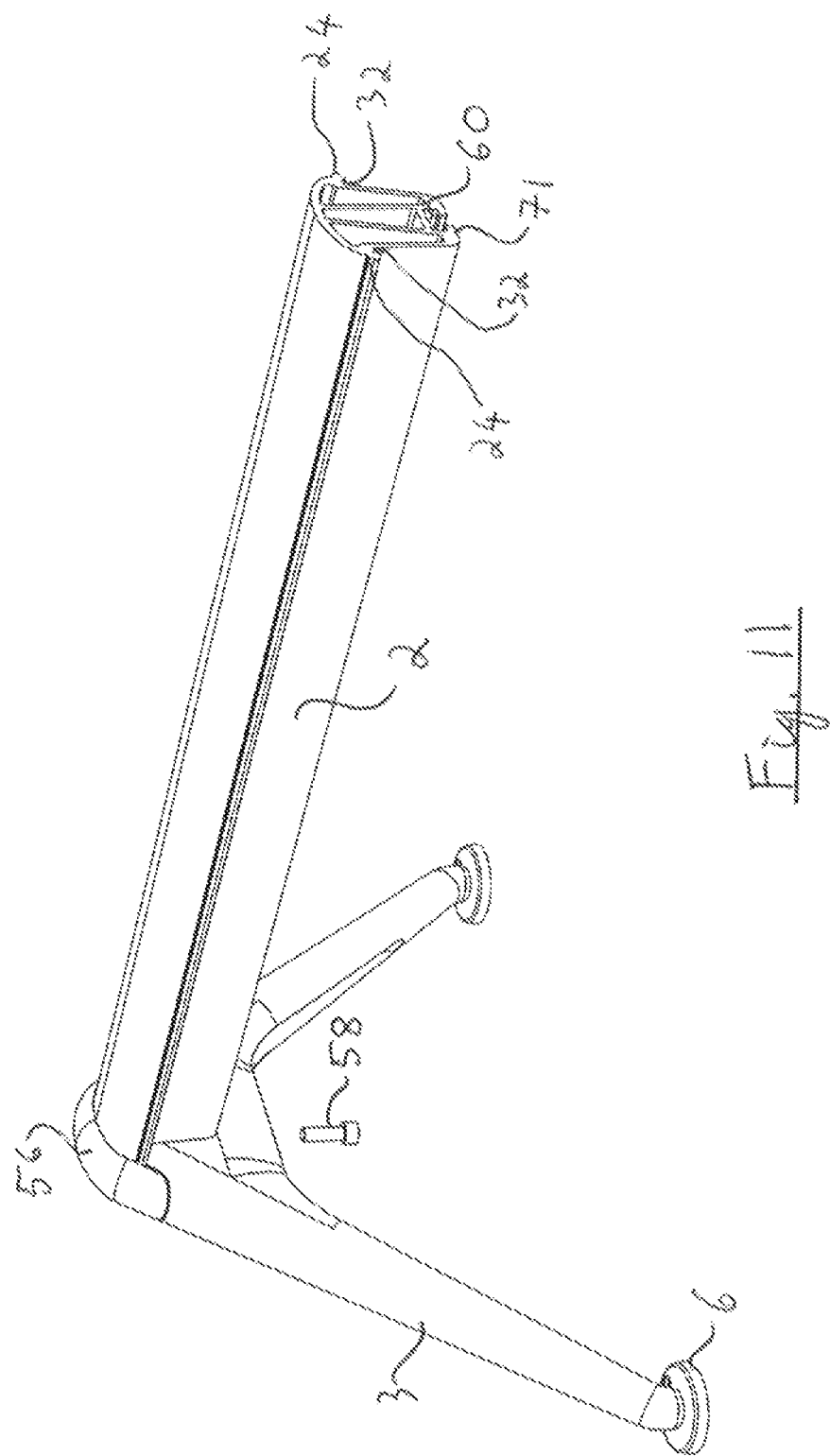
FIG. 11 is a perspective view of the beam mounted on the leg and a fastener for securing the beam to the leg.

The leg 3 with the end cap 50 inserted into the groove 53 is shown in FIG. 10. After the end cap 50 has been inserted into the groove 53, the beam 2 is slid into the recess 54 by moving it in the direction of the arrow 55. As the beam is slid into the recess 54, the retaining section 52 with nut 51 slides into slot 60 formed internally within the beam 2. After the beam 2 has been slid into the recess 54, a top cap 56 can be positioned over the beam 2 and protrusions 57 on the inside surface of the cap 56 engage under the lips 24 to retain the cap 56 in position. A threaded fastener 58 is then inserted into hole 59 in the underside of the leg 3 to engage with the nut 51 and to retain the beam 2 on the leg 3 (see FIGS. 11 and 13). This causes underside 71 of the beam 2 to be pulled down into engagement with bottom 72 of the recess 54 and effectively clamp the beam 2 to the leg 3. In addition, the tightening of the fastener 58 causes lips 66 at the top of the recess 54 to move into engagement with the undercut underside 32 of the lips 24.

Figure 13:
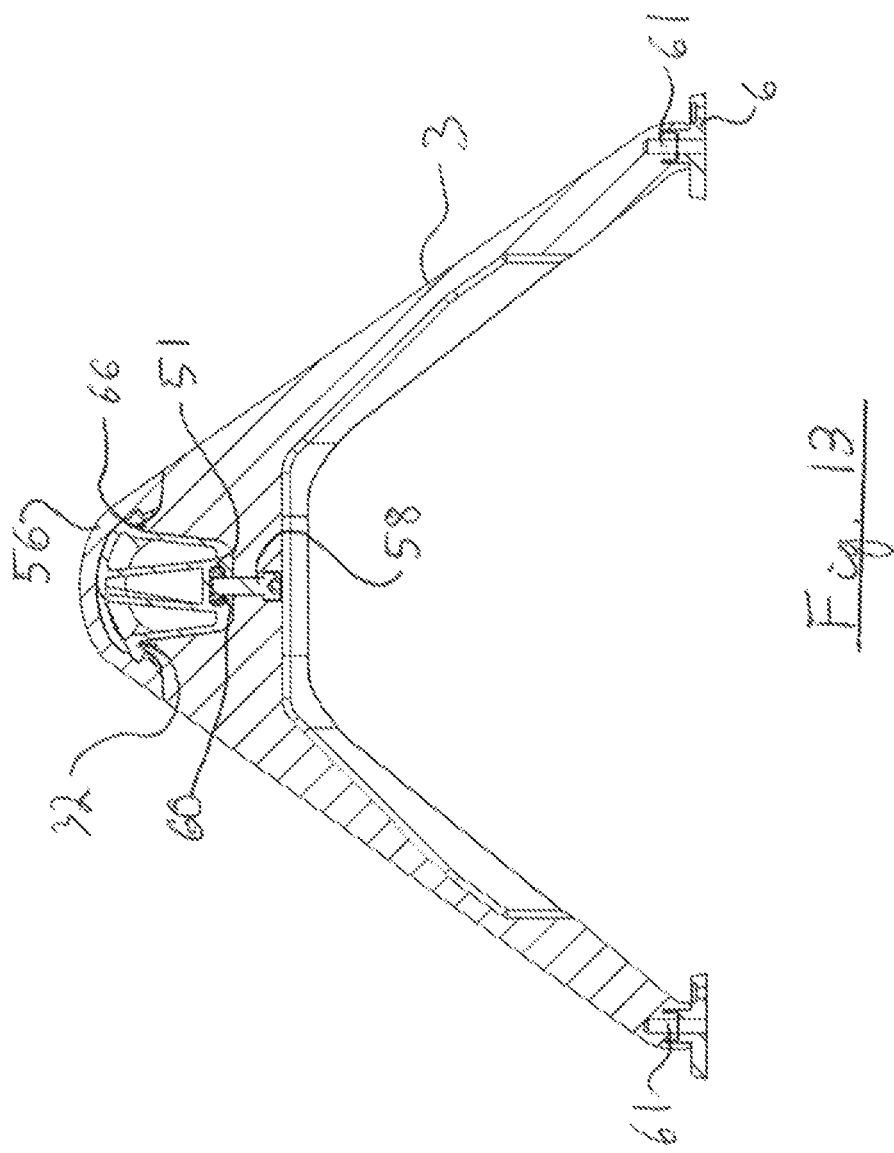
FIG. 13 is cross-sectional view through the beam and leg of FIG. 12.

FIG. 13 is a cross-sectional view through the assembled leg and beam and shows nut 51 within slot 60 and the fastener 58 engaged with the nut 51 to retain the beam 2 within the recess 54 in the leg 3. Also shown in FIG. 13 are the feet 6 which engage with threaded fasteners 61 mounted within the legs 3.

Figure 12:
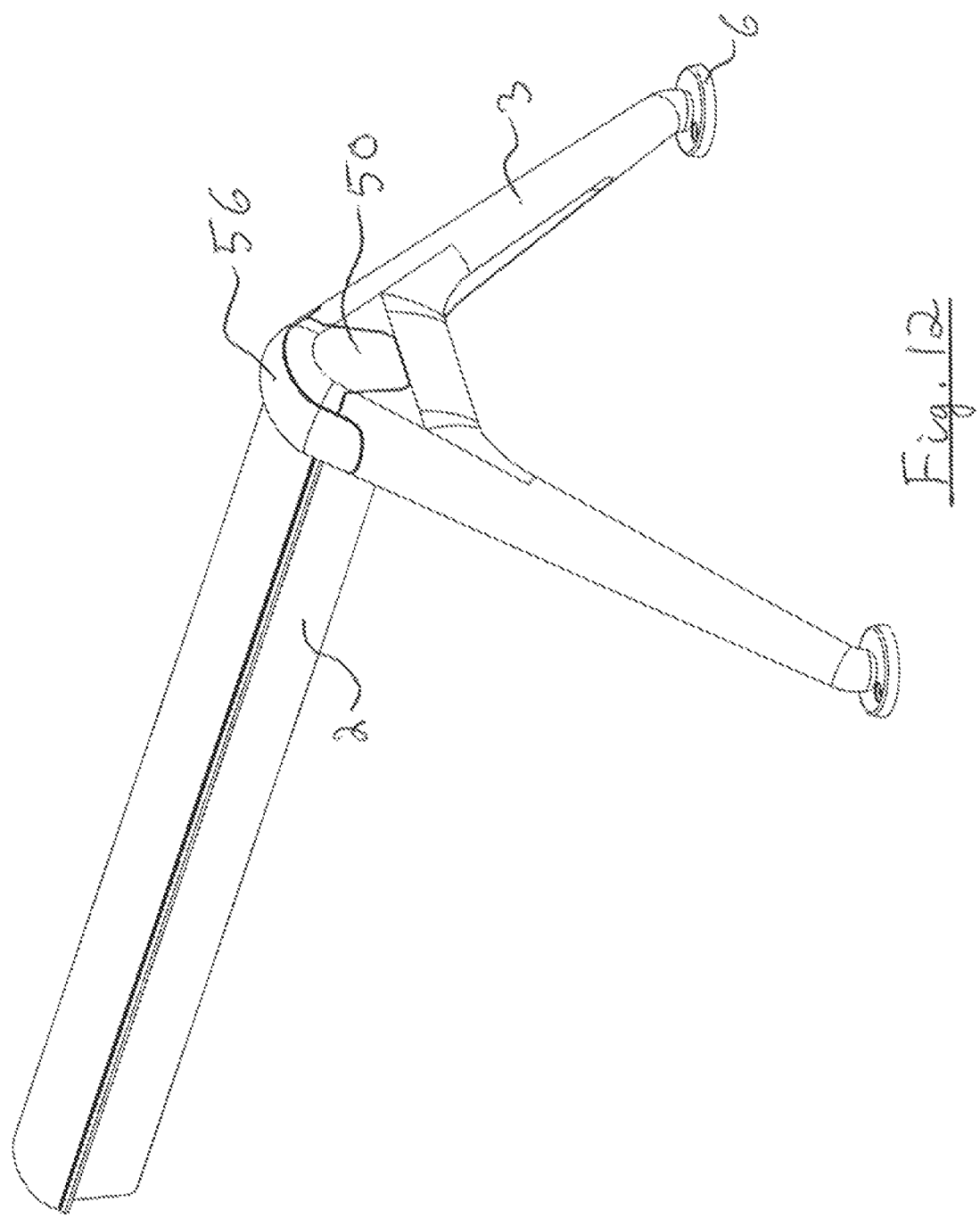
FIG. 12 is an end perspective view showing the beam mounted on the leg.

FIG. 12 shows an end perspective view of the assembled beam 2 and leg 3 with the end cap 50 and the cover cap 56.

Figure 14:
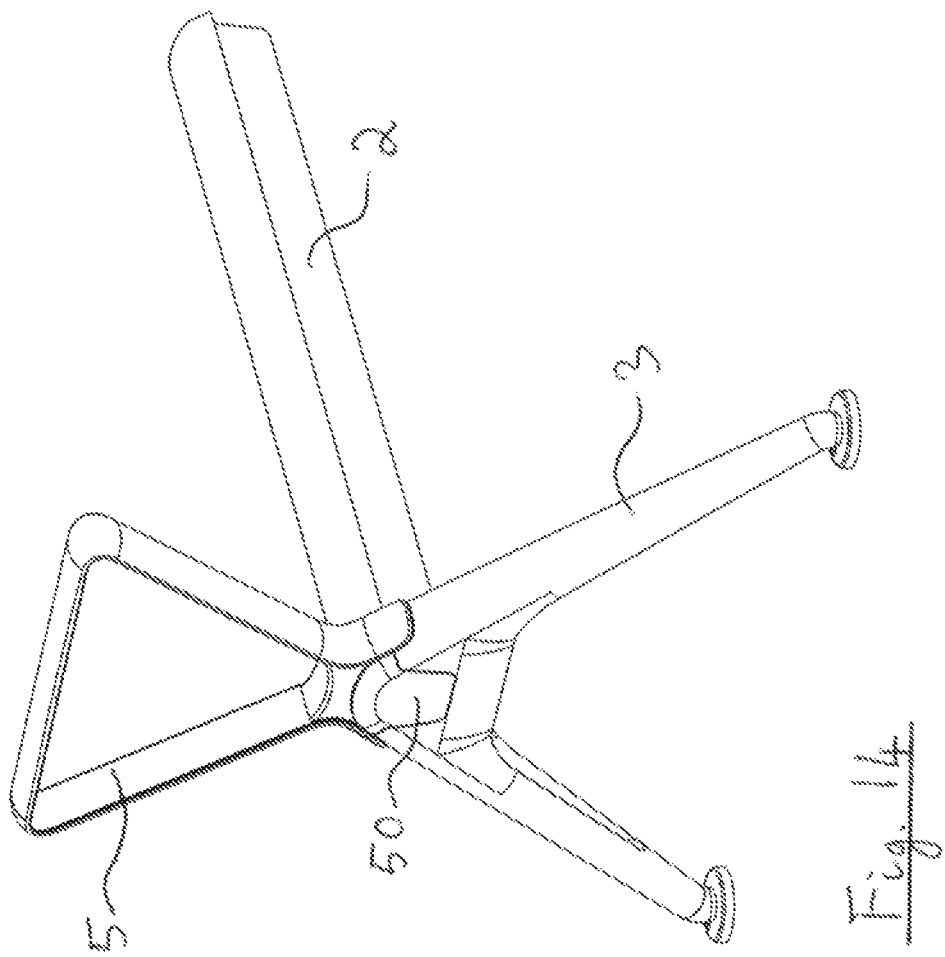
FIG. 14 is a perspective view showing an arm mounted on the beam above a leg.
Figure 15:
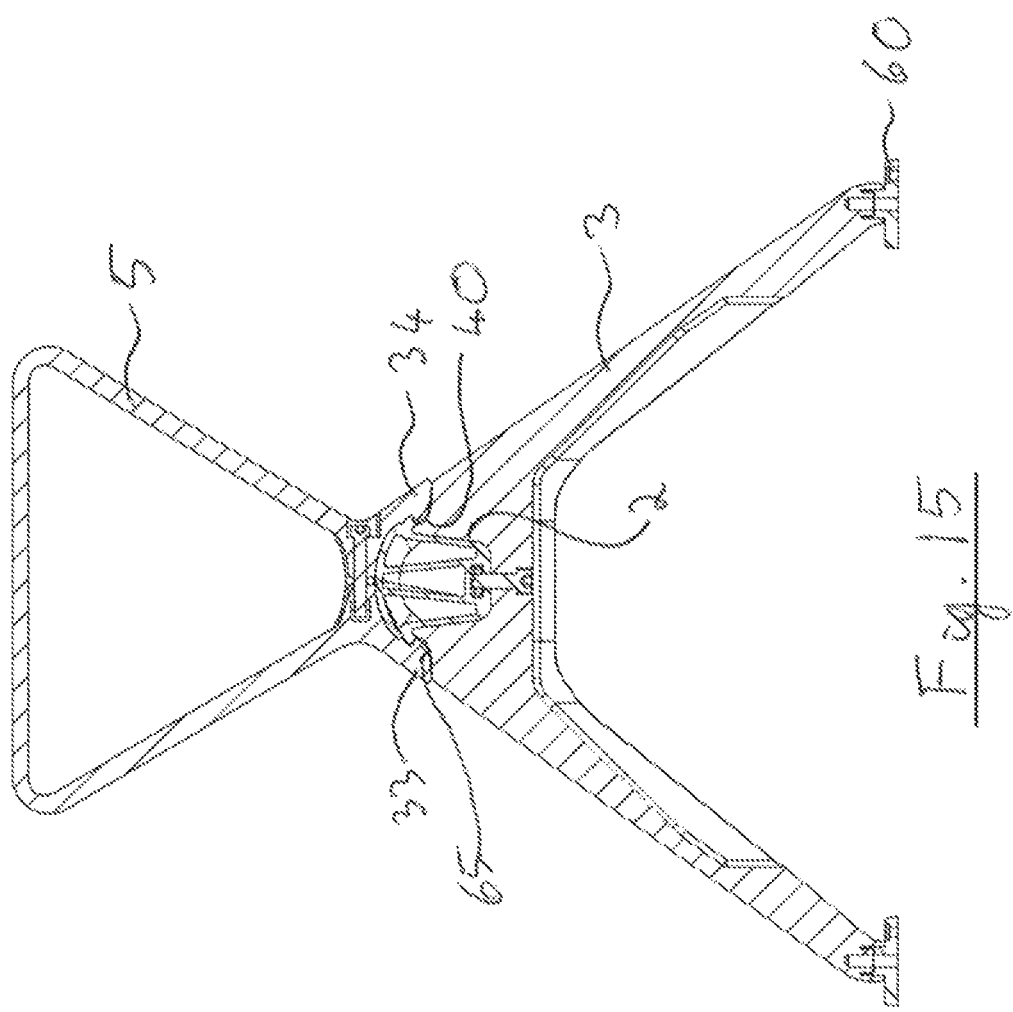
FIG. 15 is a cross-sectional view through the arm, beam and leg of FIG. 14

As an alternative to using the cover cap 56, an arm 5 may be mounted on the beam 2 above the leg 3, as shown in FIGS. 14 and 15. In this example, the cap 56 is not used. Instead of the cap 56, an arm 5 is mounted on top of the beam 2 above the leg 3 in the same manner as described above and shown in FIGS. 6 to 8. In order to facilitate this mounting of the arm 5 above the leg 3, the leg 3 includes recesses 65 which accommodate ends 33, 34 of the arm and permit protrusions 40 to engage with the lips 24 so that the arm may be mounted on the beam 2 in the same manner as described in FIGS. 6 to 8. In this respect, the protrusions 40 on the arms 5 are similar or identical to the protrusions 57 on the cap 56.

It will be noted that where an arm 5 is not mounted above the leg 3, the cap 56 covers and conceals the recesses 65. The cap 56 also covers or conceals the end of the beam 2 located in the recess 54 by fitting flush with top edge 73 of the cap 56.

As shown in FIGS. 13 and 15, when the beam 2 is inserted into the recess 54 and the leg 3 fixed to the beam using fastener 58, recess 54 extends up the sides of the beam 2 and the lips 66 engage with the undersides 23 of the lips 24. This has the advantage of enhancing rigidity of the connection of the beam to the legs 3 and helps to prevent splaying of the upper ends of the legs 3 away from the sides of the beam. It also assists with helping to prevent twisting of the beam 2 relative to the legs 3 in a horizontal plane.

An advantage of the invention is that the fasteners 12 that are used to attach the seat to the beam provide a direct connection between the beam and the seat and there is no intermediate connection through a mounting bracket.

Another advantage of the invention is that the arms may be mounted on the beam using a single fixing. This enables the arm fixing mechanism to be integrated into the arms without requiring separate clamps components to mount the arms 5 on the beam 2.

We claim:

1. A furniture system comprising a longitudinally extending member, a component comprising a mounting member and a component mounting system for mounting the component on the longitudinally extending member; the component mounting system comprising a support member, a clamp member and a fixing member, whereby in use, the support member is adapted to be located between the component and the longitudinally extending member, and the fixing member extends through the clamp member and support member to engage with the mounting member and to engage the clamp member with an engagement formation on the longitudinally extending member to clamp the support member between the longitudinally extending member and the component to mount the component on the longitudinally extending member.

2. A system according to claim 1, wherein the engagement formation extends along the length of the longitudinally extending member.

3. A system according to claim 1, wherein the engagement formation is adjacent to a surface of the longitudinally extending member contacted by the support member.

4. A system according to claim 1, wherein the engagement formation comprises an undercut formation.

5. A system according to claim 4, wherein the undercut formation is on the opposite side of the engagement formation from a surface of the longitudinally extending member contacted by the support member.

6. A system according to claim 1, wherein the engagement formation extends outwardly from a side of the longitudinally extending member.

7. A system according to claim 6, wherein the engagement formation extends outwardly at an angle to a surface of the longitudinally extending member contacted by the support member.

8. A system according to claim 7, wherein the support member has a profile which engages with a surface of the engagement formation adjacent to the surface of the longitudinally extending member.

9. A system according to claim 1, wherein the clamp member includes a first retaining formation and the support member includes a second retaining formation, and the clamp member is engaged with the support member so that the first and second retaining formations engage with each other to retain the clamp member on the support member prior to engagement of the fixing member with the mounting member.

10. A system according to claim 1, wherein a surface of the support member that engages with the longitudinally extending member comprises a concave surface and the surface of the longitudinally extending member has a complimentary convex surface that engages with the concave surface.

11. A system according to claim 10, wherein the convex surface extends along the length of the longitudinally extending member with a convex profile across the width of the longitudinally extending member.

12. A system according to claim 1, wherein the component mounting system further comprises two clamp members and two fixing members, and the longitudinally extending member includes two engagement formations on opposite sides of the longitudinally extending member; and wherein one clamp member engages with each formation when the fixing members are engaged with the mounting member.

13. A system according to claim 12, wherein the two engagement formations are substantially parallel to each other.

14. A system according to claim 1, further comprising two component mounting systems for mounting the component, one component mounting system adjacent each side edge of the component.

15. A system according to claim 1, wherein the component mounting system further comprises means to attach the support member to the component prior to engagement of the fixing members with the mounting member.

16. A system according to claim 1, wherein the component is one of a seat, a table, a power unit and a connecting member to connect the furniture system to another furniture system.

\* \* \* \* \*